United States Patent

Orth et al.

Patent Number: 5,605,286
Date of Patent: Feb. 25, 1997

[54] NOZZLE CARRIER OF A WINDSHIELD WASHING SYSTEM FOR VEHICLES, PARTICULARLY FOR VEHICLE HEADLIGHTS

[75] Inventors: Peter Orth, Lippstadt; Thomas Lind, Freudenberg; Martin Thorn, Lippetal, all of Germany

[73] Assignee: Hella KG Hueck & Co., Lippstadt, Germany

[21] Appl. No.: 438,087

[22] Filed: May 8, 1995

[30] Foreign Application Priority Data

May 13, 1994 [DE] Germany .......................... 44 16 924.8

[51] Int. Cl.⁶ ........................................... B05B 1/10
[52] U.S. Cl. ........................ 239/284.2; 239/570
[58] Field of Search .................... 239/88, 92, 570, 239/322, 284.2; 222/389, 334

[56] References Cited

U.S. PATENT DOCUMENTS

| | | | |
|---|---|---|---|
| 2,142,973 | 1/1939 | Draper | 239/42 |
| 3,068,523 | 12/1962 | Adinoff et al. | 239/322 X |
| 3,207,442 | 9/1965 | Kessler et al. | 239/22 |
| 3,661,679 | 5/1972 | Law | 239/92 X |
| 4,875,626 | 10/1989 | Behler | 239/322 X |

FOREIGN PATENT DOCUMENTS

| | | |
|---|---|---|
| 0572147A1 | 12/1993 | European Pat. Off. . |
| 2655531 | 6/1978 | Germany . |
| 3828999A1 | 3/1990 | Germany . |
| 9108956.5 | 9/1991 | Germany . |
| 4121316 | 1/1992 | Germany ............................ 239/284.2 |
| 4143316A1 | 9/1992 | Germany . |
| 4338639A1 | 6/1994 | Germany . |

*Primary Examiner*—Kevin Weldon
*Attorney, Agent, or Firm*—Griffin, Butler, Whisenhunt & Kurtossy

[57] ABSTRACT

A nozzle carrier for a windshield washing apparatus has an outer cylinder (1) and a telescoping inner cylinder (2) in the outer cylinder. The inner cylinder has at an end portion thereof a jet nozzle (3) which can be shoved out of the outer cylinder. A first plunger (4) is sealed about its periphery to the outer cylinder and is movable by pressure of washing liquid away from a second plunger (5). In this manner the inner cylinder is shoved out of the outer cylinder. When both cylinders are at their greatest spacing from one another they determine, together with the outer cylinder, a space which serves to receive a particular quantity of washing liquid. Thereafter, the second plunger is urged, by pressure of the washing liquid, toward the first plunger. This causes, after the opening of a valve in series with the jet nozzle, the washing liquid to flow through a passageway (8) of the first plunger toward the jet nozzle.

10 Claims, 3 Drawing Sheets

NOZZLE CARRIER OF A WINDSHIELD WASHING SYSTEM FOR VEHICLES, PARTICULARLY FOR VEHICLE HEADLIGHTS

BACKGROUND OF THE INVENTION

This invention concerns a nozzle carrier of a windshield washing apparatus for vehicles, particularly for vehicle headlights, having an outer cylinder, a telescoping inner cylinder in the outer cylinder with a jet nozzle at an end portion thereof which can be shoved out of the outer cylinder, first and second plungers for defining and pressing towards the jet nozzle a particular quantity of washing liquid, and with a valve in series with the jet nozzle which opens when the jet nozzle is in an outwardly-shoved position.

Such a nozzle carrier for a windshield washing apparatus for vehicles, particularly for vehicle headlights, is disclosed in German Patent Publication DE 41 43 316. This windshield washing apparatus has, exteriorly of outer and inner cylinders of the nozzle carrier, a chamber which serves to store a particular quantity of washing liquid. The particular quantity of washing liquid can be pressed out of the chamber into the inner cylinder of the nozzle carrier by compressed air. When this is done, the inner cylinder is shoved from the outer cylinder to place a jet nozzle in its operational position by pressure of the washing liquid. A valve that is connected in series with the jet nozzle opens upon a particular pressure of the washing liquid being executed. Only a small amount of washing liquid can be stored in the inner cylinder. Thus, in order to wash a windshield of a vehicle headlight a washing procedure must be repeated many times. Further, in addition to serving as a storage container for the washing liquid, the external chamber for the particular quantity of washing liquid is necessary because the particular quantity of washing liquid is pressed into the nozzle carrier by compressed air. Further, in addition to the valve which is in series with the jet nozzle, two shoving valves and two check valves are necessary. A first plunger is movably mounted in the inner cylinder and a second plunger is movably mounted in the outer cylinder. The two plungers are connected with one another by a rod-like pull element. The rod-like pull element is tubularly shaped and thereby has a bore, or passageway, for the washing liquid. After the external chamber is filled with the particular quantity of washing liquid, compressed air can, upon a shoving valve opening, enter the chamber and press the washing liquid through the passageway of the pull element into the inner cylinder. When this is done, the inner cylinder moves out of the outer cylinder. After the particular quantity of the washing liquid is pressed into the inner cylinder, the inner cylinder carries the first plunger with it a short distance by impact. The first plunger pulls with it, via the pull element, the second plunger, which opens a shoving valve on its face directed away from the jet nozzle. After the shoving valve is opened a check valve on the first plunger closes the passageway of the pull element and the compressed air presses against the face of the second plunger directed away from the jet nozzle. Upon a particular pressure being reached, an valve in series with the jet nozzle is opened and the first and second plungers press, by means of being shoved toward the jet nozzle, the washing liquid out of the jet nozzle. Upon completion of this spraying process the inner cylinder impinges on a contact which closes the shoving valve which is positioned between a compressed air source and the chamber. Thereafter, the second plunger is no longer engaged by compressed air and a spring element positioned between the inner cylinder and the outer cylinder shoves the inner cylinder into the outer cylinder and the first and second plungers to their starting positions. During this time a pump supplies washing liquid from a storage container into the chamber and thereby opens a check valve of the chamber.

German Patent Publication DE 26 55 531 discloses a movable, or shovable, washing apparatus for vehicles in which an external cylinder arranged between a storage container for washing liquid and a jet nozzle stores such a quantity of washing liquid that the stored washing liquid is sufficient for an entire washing process. The particular quantity of washing liquid is pressed by a plunger to a jet nozzle, with the plunger being moved in the cylinder by pressure of a following flow of washing liquid.

It is an object of this invention to provide a nozzle carrier of the type described in the opening paragraph above for a windshield washing apparatus for vehicles, particularly for vehicle headlights, in which the particular quantity of washing liquid for an entire washing procedure is sufficient and need not be intermediately stored externally of a telescoping cylinder. Further, pressure of the washing liquid should cause the inner cylinder to be pressed out of the outer cylinder as well as the particular quantity of washing liquid to be pressed out of the jet nozzle.

SUMMARY OF THE INVENTION

According to principles of this invention, a nozzle carrier of a windshield washing apparatus for vehicles, particularly for vehicle headlights, has a first plunger which is sealed about its outer periphery to an outer cylinder, is movable by pressure of washing liquid away from a second plunger, and serves to push the jet nozzle of the inner cylinder outwardly;

the first and second plungers, at their greatest spacing from one another, define, with the outer cylinder, a space which serves to receive the particular quantity of washing liquid;

the second plunger is movable, by pressure of the washing liquid, toward the first plunger and, upon such moving, it presses the particular quantity of washing liquid through a passageway out of the jet nozzle.

BRIEF DESCRIPTION OF THE DRAWING

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
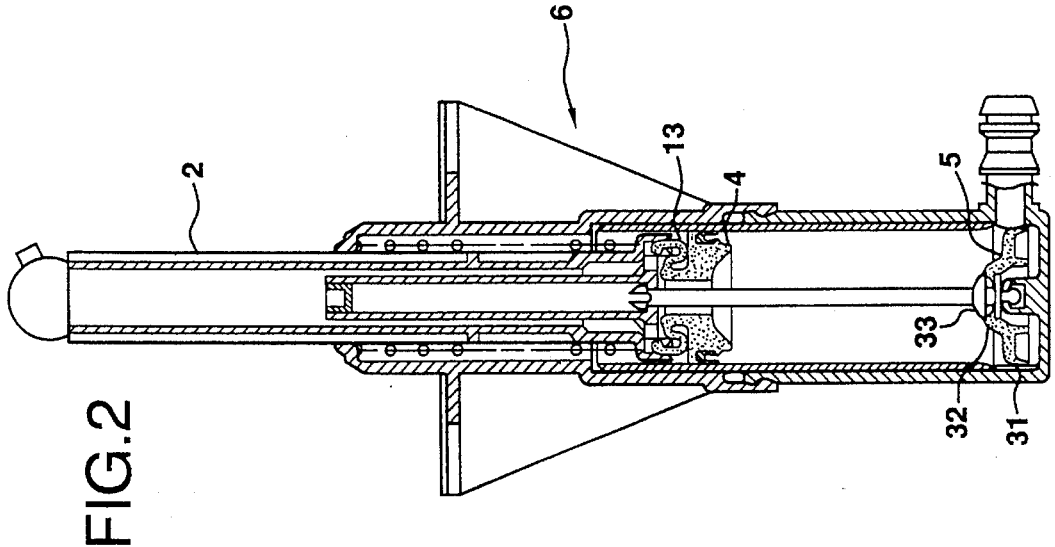
FIG. 1 is a middle, lengthwise, cross sectional view of a nozzle carrier of this invention of a windshield washing apparatus for vehicle headlights, with a jet nozzle thereof in a rest position.
Figure 2:
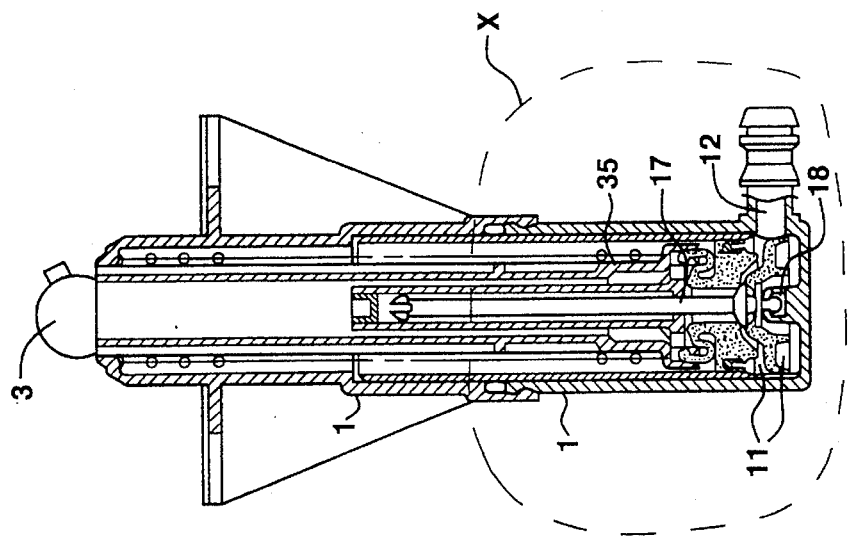
FIG. 2 is a view similar to FIG. 1 but with the jet nozzle at a free end of an inner cylinder being shoved out of the outer cylinder by pressure of washing liquid on the first plunger.
Figure 4:
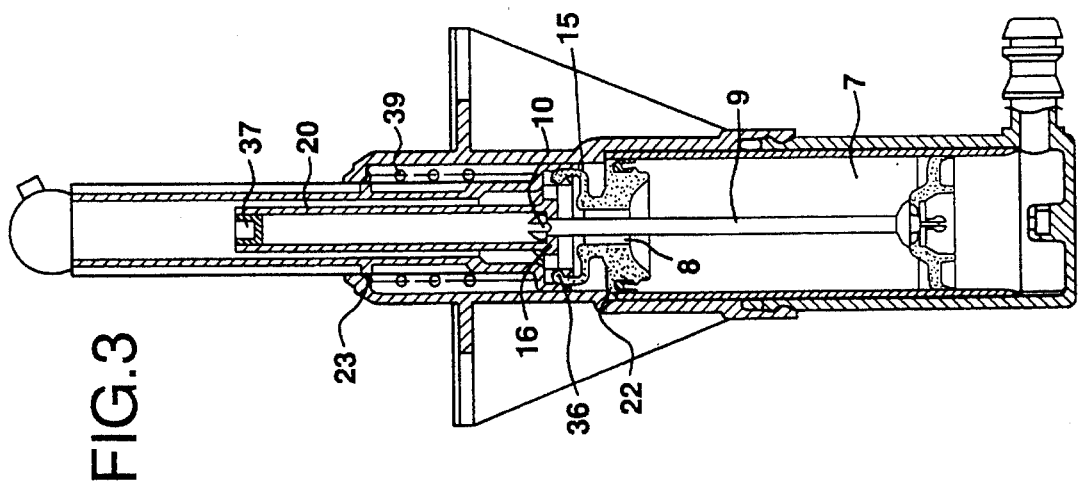
FIG. 4 is a view similar to FIGS. 1–3 but a second plunger is pressed toward the first plunger by means of pressure of the washing liquid.
Figure 3:
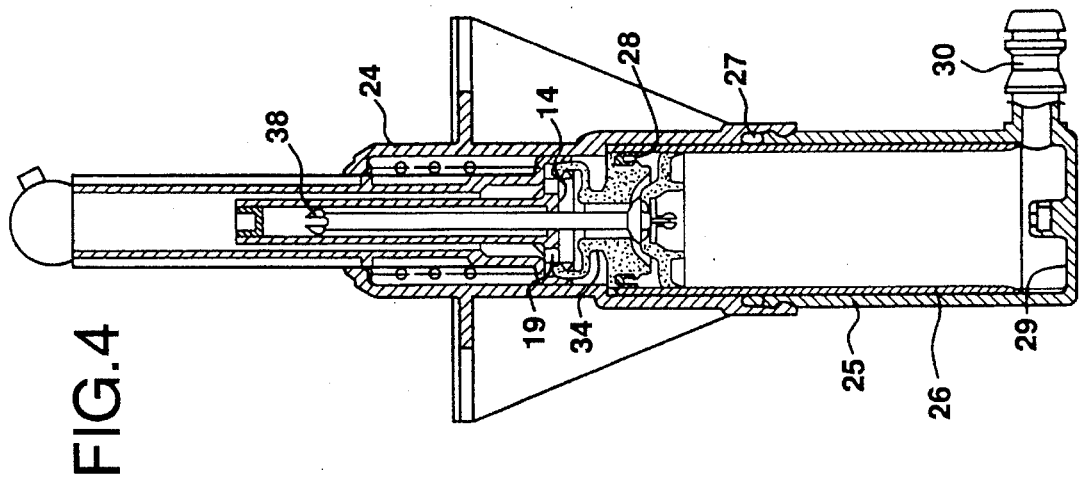
FIG. 3 is similar to FIGS. 1 and 2 but a valve on the first plunger is opened.

A nozzle carrier of a windshield washing apparatus for vehicle headlights can be mounted behind an opening of a vehicle body and has a jet nozzle 3 which can be driven from a rest position of FIG. 1 through operational positions FIGS. 3 and 4. In the operational position of FIG. 3 of the jet nozzle 3 a particular quantity of washing liquid stored in the interior of the nozzle carrier is to be sprayed onto a windshield of a vehicle headlight (not shown). After the spraying procedure the jet nozzle 3 is to be returned to its rest position. The nozzle carrier is coupled to a storage container (not shown) for washing liquid and to a pump, by means of which the washing liquid can be pressed into the interior of the nozzle carrier and, by pressure created by the pump, can be sprayed from the jet nozzle. When this is done the washing liquid is atomized into small particles, which contact the windshield with a sufficiently great speed that they, without the need of wiper vanes even in very dirty cases, are cleaned.

The nozzle carrier has an outer cylinder 1 and an inner cylinder 2 which are constructed of resinous plastic. The outer cylinder 1 is a combination of parts 24 and 25 which are snapped together in a self attaching manner. Both parts 24 and 25 receive in their interior a metal cylinder 26 which lies on an interior surface of the outer cylinder 1 and extends across the junction of the two parts 24, 25. The junction, or seam, between the two parts 24, 25 is sealed by a ring seal 27. A first plunger 4 is slidable in the metal cylinder 26 with a peripheral teflon ring 28 sealing with the interior surface of the metal cylinder 26. The metal cylinder 26 is somewhat longer than the length of the throw, or travel, of the first plunger 4. In the rest position of the jet nozzle 3 a rear interior space 11 exists between the outer cylinder 1 and a floor 29 of the part 25 into which an opening 12 leads through a side wall of the part 25. The opening 12 leads outwardly into a passageway of a tube support 30 to which a hose (not shown) can be sealingly attached to serve as a supply of washing liquid. A second plunger 5 is arranged in the rear interior space 11 in the rest position of the jet nozzle 3. The second plunger 5 is of an elastic material and has a surrounding, or peripheral, sealing lip 31 which is directed toward the floor 29 of the part 25. The rear interior space 11, which is adjacent the metal cylinder 26, has a diameter which, at least in places, is larger than the outer diameter of the second plunger 5. Because the second plunger 5, in the rest position of the jet nozzle 3, is spaced from the floor 29 of the part 25, the rear interior space 11 communicates with both facings of the second plunger 5. A free end of a rod-like pull element 9 engages in a centrally positioned opening of the second plunger 5 and is attached to the side of the second plunger 5 facing the floor 29 by means of an attaching ring on the second plunger 5. The opening 12, which serves as the supply for the washing liquid, opens into the part 25 between the second plunger 5 and the metal cylinder 26 and the first plunger 4 in the interior space 11 of the outer cylinder 1. In the rest position of the jet nozzle 3 the second plunger 5 is attached to the floor 29 of the part 25 by means of a self-releasing holding apparatus 18.

The first plunger 4, which is surrounded by the teflon ring 28, is formed, together with a ring-shaped membrane 13 which surrounds a passageway 8 of the first plunger 4, from one piece of elastic material, such as rubber. In the rest position of the jet nozzle 3 a surrounding edge defining the passageway 8 of the first plunger 4 engages a spherically-shaped sealing surface 33 of a free end portion of the rod-like pull element 9 which is attached in the central opening of the second plunger 5. The center point of the spherically-shaped sealing surface 33 lies at a central length axis of the nozzle carrier. The ring-shaped membrane 13 is formed about a free edge of a collar 34 surrounding the passageway 8 of the first plunger on a side of the first plunger 4 facing away from the second plunger 5. The inner cylinder 2, which is telescopingly movable in the outer cylinder 1 and which supports the jet nozzle 3 at its free end, is shoved onto a surrounding edge portion of the ring-shaped membrane 13 at a funnel-like end portion thereof. The ring-shaped membrane 13 has at a free edge a peripheral packing, or enlargement, 36 which grips into a floor plate 16 in an end portion 35 of the inner cylinder 2. The floor plate 16 is inset in a self attaching manner in the funnel-shaped end portion 35 of the inner cylinder 2 and has a shell-shaped part 20 in the inner cylinder 2 which is sealingly closed at its free end by a stopper 37. A centrally positioned hole 17 is in the floor plate 16 which leads to the interior of the shell-shaped part 20. The rod-like pull element 9 engages with play an edge forming the hole 17, with a self-guiding catch 38 engaging behind an edge area defining the hole 17 directed toward the jet nozzle, and upon movement of the second plunger 5 the rod-like pull element 9 can be driven into the interior of the shell-shaped part 20. A ring-shaped seal surface 14 of the floor plate 16 extends about the hole 17 against which, in the rest position of the jet nozzle 3, the collar 34 lies so as to serve as a sealing surface 15. Supply openings 19 are in the floor plate 16 between the ring-shaped seal surface 14 and the free edge of the ring-shaped membrane 13 which supply openings lead to a space between the shell-shaped part 20 and the inner cylinder 2. The first plunger 4, in an operational position of the jet nozzle 3, lies at a second stop 22 of the part 24 of the outer cylinder 1. The second stop 22 is formed from a surrounding shoulder on the inner surface of the part 24. Between the second stop 22 and the free end of the outer cylinder 1 adjacent to the jet nozzle 3, the outer cylinder 1 has a smaller internal diameter than at the part in which the first plunger is movable. The funnel-shaped part 35 of the inner cylinder 2 is movable in the part of the outer cylinder 1 adjacent the metal cylinder 26. In this regard, much play is created between the outer edge of the funnel-shaped end portion 35 of the inner cylinder 2 and the interior of the part 24 of the outer cylinder 1. A spring element 39 is placed between an outer edge of the funnel-shaped end portion 35 and an inner edge of the part 24 adjacent the jet nozzle 3. The spring element 39 is a coil spring which is shoved onto the inner cylinder 2 and which presses the inner cylinder 2, together with the first and second plungers 4, 5, toward the floor 29 of the part 25.

When washing liquid is pressed between the two plungers 4, 5 the second plunger 5, at first, stays in its rest position while the first plunger 4, because of pressure of the washing liquid against the force of the spring element 39, is shoved away from the second plunger 5. The second plunger 5 is pulled with the first plunger 4 when the catch 38 of the rod-like pull element 9 lies against the first stop 10 of the floor plate 16. This pulling procedure ends when the first plunger 4 contacts the second stop 22 of the outer cylinder 1. When the pulling procedure of the second plunger 5 begins, the second plunger 5 releases itself from the holding apparatus 18 holds it to the floor 29. When the pull procedure ends, the sealing lip 31 of the second plunger 5 sealingly engages on the inner side of the metal cylinder 26. Until this point, both seal surfaces 14, 15 of the valve 6 sealingly oppose, or engage, one another. Only after the facing side of the second plunger 5 directed toward the floor 29 is acted on by pressure of the washing liquid and the first plunger 4 contacts the second stop 22 of the outer cylinder 1 does the valve 6 open. That is, the membrane 13, which is constructed of an elastic material, allows a lifting of the floor plate 16 from the seal surface 15 of the first plunger 4. So that the membrane 13 is not overloaded with tension, it is beneficial for the inner cylinder 2 to contact a third stop 23 of the outer cylinder 1. The jet nozzle 3 is then in a fully operational position. Because the valve 6 is now open, the second plunger 5 can move further toward the first plunger 4. In this manner, the second plunger 5 presses the particular quantity of washing liquid enclosed between it and the first plunger 4 through the passageway 8 of the first plunger 4, through the open valve 6, and through the supply opening 19 of the inner cylinder 2 toward the jet nozzle 3. After the particular quantity of washing liquid has been sprayed out, which is sufficient washing liquid for an entire wash procedure of a windshield, the spherical-shaped sealing surface 33 of the second plunger 5 lies firmly against the first plunger 4. Thus, no further washing liquid can exit from the jet nozzle 3, even if the pump continues to operate. After the pump has automatically turned off, the spring element 39 urges the inner cylinder 2, together with the first and second plungers 4 and 5, toward the floor 29 of the outer cylinder 1 until the jet nozzle 3 reaches its rest position. For a single jet nozzle the volume for the particular quantity of washing liquid can be varied as desired by a change in length of the rod-like pull element 9.

Figure 5:
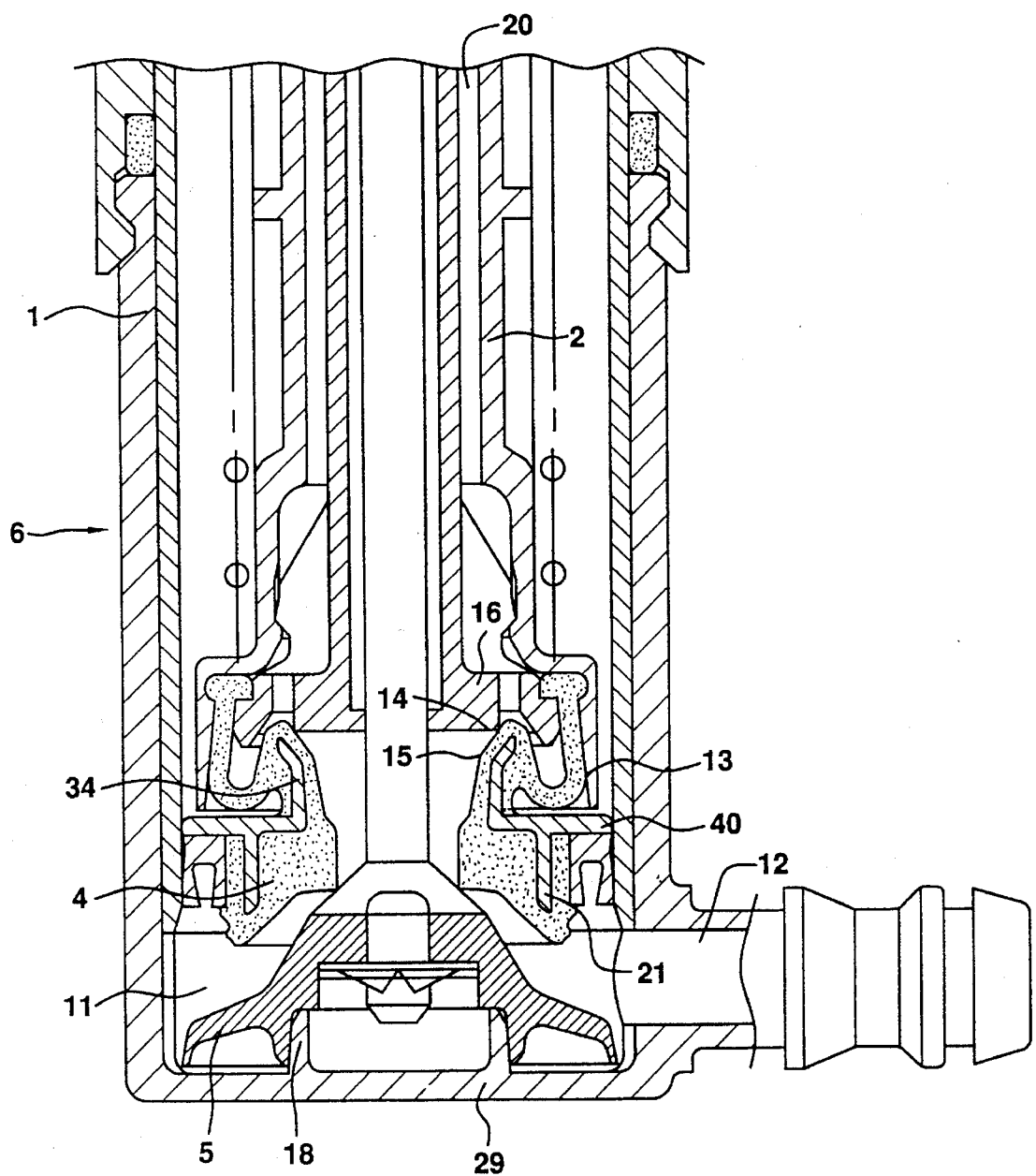
FIG. 5 is an enlarged segmented view of a portion X of FIG. 1.

The construction of the valve 6 and the first and second plungers 4 and 5 are shown in detail in FIG. 5. The first plunger 4, which is constructed of an elastic material with the ring-shape membrane 13, is stiffened by a metal ring 21 formed therein. The collar 34, whose seal surface 15 lies opposing the seal surface 14 of the floor plate 16, is also stiffened by the metal ring 21. The seal surface 15 of the collar 34 forms a part of a sphere whose center lies on the length axis of the nozzle carrier while the seal surface 14 is a peripheral edge of the floor plate 16. The metal ring 21 has an outwardly-directed edge portion 40 with which the first plunger contacts the second stop 22 of the outer cylinder 1. The free edge portion of the funnel-shaped end portion 35 of the inner cylinder 2 serves as a support element for the membrane 13. Thus, this also, upon a very large pressure of the washing liquid, cannot stretch so far inwardly that it rubs against the inner surface of the outer cylinder 1 to be thereby damaged. The holding apparatus 18, between the second plunger 5 and the floor 29 of the outer cylinder 1, is comprised of a hollow projection of the floor 29 which grips into a depression of the second plunger 5.

With a beneficial embodiment of this invention the space which serves to store the particular quantity of washing liquid does not depend on the length nor diameter of the inner cylinder. Thus, the inner cylinder need not have larger dimensions than is necessary. The outer cylinder, in which the particular quantity of washing liquid can be stored, is in the vehicle covered by the vehicle body and can be formed to be as large as is necessary.

In a nozzle carrier with a rod-shaped pull element which is fixedly coupled to the second plunger and movable in the inner cylinder, and which, upon the jet nozzle being shoved out, by its contact with a first stop on the inner cylinder, pulls the second plunger with it, it is further beneficial that the pull element passes through the passageway of the first plunger and that there is sufficient room created between it and the passageway of the first plunger for supplying the washing liquid. In this regard, the path along which the second plunger is pulled should be so long that the first and second plungers, together with the outer cylinder, sealingly enclose the particular quantity of washing liquid between them. Thereafter, the following washing liquid presses exclusively against the second plunger which shoves the first plunger via the sealingly enclosed particular quantity of washing liquid toward the jet nozzle until the first plunger contacts the stop on the outer cylinder. Thereafter pressure against the valve in series with the jet nozzle is increased to open it. The particular quantity of washing liquid is pressed through the valve to the jet nozzle and sprayed out of it. After the particular quantity of washing liquid is sprayed out, the inner cylinder, which carries the jet nozzle, and the first and second plungers can be shoved to their rest positions by means of a spring element mounted in the nozzle carrier.

In this connection, it is further beneficial that, when the jet nozzle is in its rest position, between the side of the first plunger directed away from the jet nozzle and the outer cylinder a rear interior space of the nozzle carrier is created into which an opening of the outer cylinder extends serving as a supply for the washing liquid, with the rear interior space for receiving the plunger communicating with both facing sides of the second plunger and the opening for supplying the washing liquid being arranged in the outer cylinder between both plungers. In this manner, no additional valve is needed to move the nozzle carrier. Both facing sides of the second plunger are, in the rest position of the second plunger, contacted by following, flowing, washing liquid until it, the second plunger, is pulled by the first plunger. When this takes place, it is practical that the rear interior space of the outer cylinder, which in the rest position of the jet nozzle receives the second plunger, at least in the area of the second plunger, has a larger interior diameter than the outer diameters of the first and second plungers.

Further, it is beneficial that the second plunger lies against the first plunger after the particular quantity of washing liquid has been sprayed out and closes the passageway of the first plunger. In this manner no further washing liquid can exit from the jet nozzle after the particular quantity of washing liquid has exited.

It is further beneficial that the valve connected upstream of and in series with the jet nozzle is formed of the ring-shaped membrane which surrounds the passageway on the side of the first plunger facing the jet nozzle to surroundingly seal the first plunger with the inner cylinder and of two opposite ring-shaped seal surfaces, respectively of the first plunger and the inner cylinder, with the membrane between them. In this manner the valve which is in series with the jet nozzle can be opened only after the first plunger contacts the stop of the outer cylinder. It is thereby assured that, even with pressure fluctuations, premature exiting of washing liquid from the jet nozzle is prevented. In this regard, it is also practical that, in the operational position of the jet nozzle, the inner cylinder contacts a stop of the outer cylinder. Thus, the valve, which is constructed from the membrane, is not overloaded in tension when it is opened and the operational life of the membrane is increased.

It is additionally beneficial that the seal surface of the inner cylinder is formed by the floor plate of the inner cylinder in which a central hole is defined by an edge which serves as a first stop directed toward the jet nozzle for the rod-like pull element, with the seal surface of the floor plate surrounding the central hole, and there being at least one supply opening for the washing liquid in the floor plate between the seal surface and the floor plate's outer edge. Such an embodiment is uncomplicated and cost effective to manufacture. In this regard, it is further practical that the floor plate of the inner cylinder is a separate part, that the membrane is sealingly seated between it and the edge of the inner cylinder, and that the shell-shaped part is mounted on the floor plate of the inner cylinder to extend into the interior of the inner cylinder and is formed to be sealed toward the inner cylinder, whereby the free end portion of the rod-like pull element can extend into the shell-shape part and the membrane extends between the seal surfaces of the first plunger and the inner cylinder. In this manner the particular quantity of washing liquid can only flow into the interior of the inner cylinder when the valve is opened. So that the function of the nozzle carrier is assured, the interior of the shell-shape part must be hydraulically coupled to the passageway for the washing liquid via the central opening of the floor plate.

Further, it is beneficial that the first plunger and the membrane are molded as one piece of elastic material. The membrane has a sufficient elasticity while the plunger is sufficiently stiff if the plunger, of elastic material, includes an encircling metal ring. A sealing coupling between the membrane and the plunger is certain.

Further, it is beneficial that, in the rest position of the jet nozzle, the second plunger is held at a floor of the outer cylinder by a self releasing holding apparatus. In this manner, the second plunger cannot be prematurely moved by pressure of the washing liquid, but rather is only moved when the second plunger is pulled by the first plunger. The holding apparatus is self activating.

The embodiments of the invention in which an exclusive property or privilege are claimed are defined as follows:

We claim:

1. Nozzle carrier of a windshield washing apparatus for vehicles, particularly for vehicle headlights, having an outer cylinder (1), a telescoping inner cylinder (2) in the outer cylinder with a jet nozzle (3) at an end portion thereof which can be shoved from the outer cylinder, first and second plungers (4, 5) for defining and pressing toward the jet nozzle a particular quantity of washing liquid, and a valve (6) coupled in series with the jet nozzle which is opened in an outwardly-shoved position of the jet nozzle, wherein:

the first plunger (4) is sealed about its periphery to the outer cylinder, is movable by pressure of the washing liquid away from the second plunger (5), and serves to push the jet nozzle of the inner cylinder outwardly;

the first and second plungers, at their greatest spacing from one another, determine, with the outer cylinder (2), a space which serves to receive the particular quantity of washing liquid; and the second plunger (5) is movable by pressure of the washing liquid toward the first plunger and, upon such moving, presses the particular quantity of washing liquid through a passageway (8) of the first plunger and out the jet nozzle.

2. Nozzle carrier as in claim 1 wherein is further included a rod-like pull element (9) which: is fixedly connected to the second plunger (5); which extends into the inner cylinder (2); and which pulls the second plunger (5) with it when the jet nozzle is pushed outwardly by engaging a first stop (10) of the inner cylinder (2), wherein:

the pull element (9) passes through the passageway (8) of the first plunger (4) and there is sufficient room for the passage of washing liquid between it and walls defining the passageway (8) of the first plunger (4).

3. Nozzle carrier as in claim 2 wherein a rear interior space (11) of the nozzle carrier is defined when the jet nozzle is in a rest position between a side of the first plunger (4) facing away from the jet nozzle (3) and the outer cylinder (1) into which an opening (12) of the outer cylinder (1) serves to supply washing liquid, with the rear interior space (11), which receives the second plunger (5), allowing liquid flow between both faces of the second plunger (5).

4. Nozzle carrier as in claim 1 wherein the second plunger (5), after the particular quantity of washing liquid has been sprayed out, lies against the first plunger (4) and closes the passageway (8) of the first plunger (4).

5. Nozzle carrier as in claim 1 wherein the valve (6) coupled in series with the jet nozzle (3) is formed of a ring-shaped membrane (13), which surrounds the passageway (8) on the side of the first plunger (4) directed toward the jet nozzle (3) and which peripherally seals the first plunger (4) to the inner cylinder (2), and from two ring-shaped seal surfaces (15, 14) of the first plunger (4) which lie opposite one another near a center of the membrane (13).

6. Nozzle carrier as in claim 5 wherein the seal surface (14) of the inner cylinder (2) is formed from a floor plate (16) of the inner cylinder (2) in which a central hole (17) is made whose edge area facing the jet nozzle is the first stop (10) for the rod-like pull element (9), wherein the seal surface (14) of the floor plate (16) surrounds the central hole (17) and at least one supply opening (19) for the washing liquid is in the floor plate (16) between the seal surface (14) and the floor plate's outer edge.

7. Nozzle carrier as in claim 6 wherein the floor plate (16) of the inner cylinder (2) is a separate part, the membrane (13) is sealingly seated between the floor plate (16) and an edge of the inner cylinder (2), and a shell-shaped part (20) is mounted on the floor plate (16) of the inner cylinder (2) to extend into the interior of the inner cylinder (2), wherein the shell-shaped part is sealed with the inner cylinder (2), with a free end portion of the rod-like pull element (9) being movable into the shell-shaped part (20) and the membrane (13) extending between the seal surface (15) of the first plunger (4) and the inner cylinder (2).

8. Nozzle carrier as in claim 1 wherein a membrane (13) of elastic material is formed on the first plunger (4).

9. Nozzle carrier as in claim 1 wherein the second plunger (5) is held against a floor (29) of the outer cylinder (1) by a self-releasing holding apparatus (18) when the jet nozzle (3) is in a rest position.

10. Nozzle carrier as in claim 1 wherein the first plunger (4), when the jet nozzle (3) is shoved out but before the valve (6) is opened, contacts a second stop (22) of the outer cylinder (1) and wherein the inner cylinder (2) lies against a third stop (23) of the outer cylinder (1) after the valve (6) automatically opens.

* * * * *